United States Patent
Kubono et al.

(10) Patent No.: US 10,375,770 B2
(45) Date of Patent: Aug. 6, 2019

(54) ELECTROMAGNETIC INDUCTION HEATING APPARATUS AND LIGHT ALLOY WHEEL MANUFACTURING METHOD

(71) Applicant: TSK CORPORATION, Shizuoka (JP)

(72) Inventors: Tadashi Kubono, Shizuoka (JP); Seiji Kawamoto, Shizuoka (JP)

(73) Assignee: TSK CORPORATION, Shizuoka (JP)

( * ) Notice: Subject to any disclaimer, the term of this patent is extended or adjusted under 35 U.S.C. 154(b) by 0 days.

(21) Appl. No.: 15/574,844

(22) PCT Filed: May 1, 2017

(86) PCT No.: PCT/JP2017/017121
§ 371 (c)(1),
(2) Date: Nov. 17, 2017

(87) PCT Pub. No.: WO2018/020768
PCT Pub. Date: Feb. 1, 2018

(65) Prior Publication Data
US 2018/0235035 A1    Aug. 16, 2018

(30) Foreign Application Priority Data
Jul. 25, 2016 (JP) ................................. 2016-145702

(51) Int. Cl.
*H05B 6/10* (2006.01)
*H05B 6/06* (2006.01)
(Continued)

(52) U.S. Cl.
CPC ............... *H05B 6/06* (2013.01); *B21D 53/26* (2013.01); *B60B 3/06* (2013.01); *C21D 9/34* (2013.01);
(Continued)

(58) Field of Classification Search
CPC ... H05B 6/02; H05B 6/06; H05B 6/10; H05B 6/101; H05B 6/102; H05B 6/104;
(Continued)

(56) References Cited

U.S. PATENT DOCUMENTS

2004/0139610 A1* 7/2004 Suzuki ................. B21D 22/18
29/894.3
2008/0302775 A1* 12/2008 Machrowicz .......... B21D 9/076
219/149

(Continued)

FOREIGN PATENT DOCUMENTS

CN          101822123        9/2010
CN          105063521        11/2015
(Continued)

OTHER PUBLICATIONS

"Office Action of Japan Counterpart Application," dated Dec. 1, 2016, with English translation thereof, p. 1-p. 7.
(Continued)

*Primary Examiner* — Hung D Nguyen
(74) *Attorney, Agent, or Firm* — JCIPRNET (57) ABSTRACT

To show an electromagnetic induction heating apparatus in which an object to be heated such as a half-finished light alloy wheel can be heated efficiently to have a predetermined temperature in a short time. An electromagnetic induction heating apparatus 1 includes a rotating body 2 with a plurality of magnets 21 arranged such that the same pole is positioned on the side of an object to be heated 8 and a rotation driving motor 3 for rotating the rotating body 2, in which the object to be heated 8 is heated by an induced current generated when the rotating body 2 is rotated. By controlling the distance D between the magnets 21 of the rotating body 2 and the object to be heated 8 with a moving
(Continued)

motor 6, a light alloy wheel or the like, which has a high thermal expansion coefficient, can be well-heated efficiently.

4 Claims, 8 Drawing Sheets

(51) Int. Cl.
  *B60B 3/06* (2006.01)
  *H05B 6/02* (2006.01)
  *B21D 53/26* (2006.01)
  *C21D 9/34* (2006.01)
  *F27D 11/12* (2006.01)

(52) U.S. Cl.
  CPC ............... *F27D 11/12* (2013.01); *H05B 6/02* (2013.01); *H05B 6/10* (2013.01)

(58) Field of Classification Search
  CPC ........ H05B 6/108; H05B 6/109; H05B 6/145; H05B 6/405; H05B 6/42; B21D 53/26; B60B 3/02; B60B 3/06; C21D 9/34; F27D 11/12
  USPC ....... 219/600, 628, 635, 639, 640, 641, 667, 219/672, 676
  See application file for complete search history.

(56) References Cited

U.S. PATENT DOCUMENTS

| | | |
|---|---|---|
| 2010/0219177 A1 | 9/2010 | Matsui |
| 2011/0315677 A1 | 12/2011 | Suominen |
| 2012/0085753 A1* | 4/2012 | Fitch ..................... H05B 6/101 219/647 |

FOREIGN PATENT DOCUMENTS

| | | |
|---|---|---|
| EP | 2209349 | 7/2010 |
| JP | H05082248 | 4/1993 |
| JP | 2003127030 | 5/2003 |
| JP | 2004537147 | 12/2004 |
| JP | 2005324246 | 11/2005 |
| JP | 2006236856 | 9/2006 |
| JP | 2008-202099 A * | 9/2008 |
| JP | 2011049130 | 3/2011 |
| JP | 2012160369 | 8/2012 |
| JP | 2014500906 | 1/2014 |
| JP | 3199201 | 8/2015 |
| KR | 101541417 | 8/2015 |
| WO | 2003011002 | 2/2003 |
| WO | 2009048049 | 4/2009 |
| WO | 2012050552 | 4/2012 |

OTHER PUBLICATIONS

"Office Action of Japan Counterpart Application," dated Feb. 9, 2017, with English translation thereof, p. 1-p. 4.
"Office Action of Korea Counterpart Application," with machine English translation thereof, dated Aug. 1, 2018, p. 1-p. 10.
"Office Action of China Counterpart Application," dated Oct. 31, 2018, with English translation thereof, p. 1-p. 15.
"Search Report of Europe Counterpart Application", dated Feb. 27, 2019, p. 1-p. 9.
František Mach, et al., "Induction heating of cylindrical nonmagnetic ingots by rotation in static magnetic field generated by permanent magnets," Journal of Computational and Applied Mathematics, vol. 236, Feb. 2012, pp. 4732-4744.
Aleksandr I. Aliferov, et al., "Electromechanical and Energetic Characteristics of System of Induction Heating by Permanent Magnets," 2016 17th International Conference of Young Specialists on Micro/Nanotechnologies and Electron Devices (EDM), Jun. 2016, pp. 518-521.
Office Action of China Counterpart Application, with English translation thereof, dated Apr. 22, 2019, pp. 1-15.

* cited by examiner

ELECTROMAGNETIC INDUCTION HEATING APPARATUS AND LIGHT ALLOY WHEEL MANUFACTURING METHOD

CROSS-REFERENCE TO RELATED APPLICATION

This application is a 371 application of the international PCT application serial. no. PCT/JP2017/017121, filed on May 1, 2017, which claims the priority benefit of Japan application no. 2016-145702, filed on Jul. 25, 2016. The entirety of each of the above-mentioned patent applications is hereby incorporated by reference herein and made a part of this specification.

FIELD OF THE INVENTION

The present invention relates to an electromagnetic induction heating apparatus and a light alloy wheel manufacturing method.

BACKGROUND ART

There have conventionally been provided methods for manufacturing a light alloy wheel such as an aluminum wheel made of aluminum alloy, in which an aluminum wheel is casted to be a half-finished product and then the aluminum wheel undergoes spinning processing to have a predetermined rim shape formed. For example, Patent Document 1 describes a manufacturing method in which an aluminum wheel is casted to be a half-finished product and the half-finished aluminum wheel is then partially processed to form a rim portion.

PRIOR ART DOCUMENT

Patent Document

[Patent Document 1] Japanese Published Unexamined Patent Application No. 2003-127030

SUMMARY OF THE INVENTION

Problems to be Solved by the Invention

In the manufacturing method in which an aluminum wheel is partially processed to form a rim portion, it is necessary for the half-finished aluminum wheel to be heated in advance of the processing to have a temperature suitable for the processing. While Patent Document 1 describes heating using a heating furnace, the step of preliminarily heating the half-finished aluminum wheel in the heating furnace takes time, leading to a problem of an increase in the scale of an aluminum wheel manufacturing facility.

The present invention provides an electromagnetic induction heating apparatus in which an object to be heated such as a half-finished light alloy wheel can be heated efficiently to have a predetermined temperature in a short time.

The inventors of the present application have found that, by using electromagnetic induction heating, it is possible to heat an object to be heated more efficiently in a shorter time than conventional manufacturing methods using a heating furnace, and have made the present invention.

The present invention provided to solve the above-described problem is as follows.

[1] An electromagnetic induction heating apparatus including a rotating body with a plurality of magnets arranged such that the same pole is positioned on the side of an object to be heated, a rotation driving means for rotating the rotating body, a temperature measuring means for measuring the temperature of the object to be heated, and a moving means for moving at least one of the rotating body and the object to be heated to change a distance between the rotating body and the object to be heated, in which the object to be heated is heated by an induced current generated when the rotating body is rotated.

[2] The electromagnetic induction heating apparatus according to [1], further including a distance measuring means for measuring the distance between a plurality of the magnets and the object to be heated, in which the moving means moves at least one of the rotating body and the object to be heated based on a distance measured by the distance measuring means.

[3] The electromagnetic induction heating apparatus according to [2], in which a plurality of the distance measuring means are provided, and in which the moving means moves at least one of the object to be heated and the rotating body based on the maximum value or the minimum value of a plurality of distances detected by the plurality of distance measuring means.

[4] The electromagnetic induction heating apparatus according to [2] or [3], in which the distance measuring means is for measuring the distance based on a change in electrostatic capacity between the magnets of the rotating body and the object to be heated or a change in a laser beam.

[5] An electromagnetic induction heating apparatus including a rotating body with a plurality of magnets arranged such that the same pole is positioned on the side of an object to be heated, a rotation driving means for rotating the rotating body, a temperature measuring means for measuring the temperature of the object to be heated, and a moving means for moving at least one of the rotating body and the object to be heated to change a distance between the rotating body and the object to be heated, in which the rotating body is arranged with a plurality of the magnets, in which the object to be heated is a half-finished light alloy wheel, in which the temperature measuring means measures first temperature of the half-finished light alloy wheel on the side of the rotating body, and second temperature of the half-finished light alloy on the opposite side of the rotating body, in which the moving means changes the distance based on the first and second temperatures, in which the rotation driving means changes a rotation speed of the rotating body based on the first and second temperatures, and in which the object to be heated is heated by an induced current generated when the rotating body is rotated.

[6] The electromagnetic induction heating apparatus according to [5], in which at least one of the rotation speed of the rotating body and the distance between the magnets and the object to be heated is changed such that the difference between the first and second temperatures becomes 50 to 150° C.

[7], A light alloy wheel manufacturing method including a heating step of heating a half-finished light alloy wheel through electromagnetic induction, in which in the heating step, the half-finished light alloy wheel is heated by an induced current generated when the rotating body of the electromagnetic induction heating apparatus according to [1] is rotated below the half-finished light alloy wheel.

[8] The light alloy wheel manufacturing method according to [7], further including a casting step of forming the half-finished light alloy wheel and a processing step of processing the light alloy wheel heated in the heating step.

Effects of the Invention

According to the present invention, since a plurality of the magnets are arranged such that the same pole is positioned on the side of the object to be heated, the magnetic field lines are in parallel to run farther, whereby the object to be heated can be heated efficiently by an induced current generated when the rotating body is rotated. It is therefore possible for an object to be heated such as a half-finished light alloy wheel to be heated efficiently to have a predetermined temperature in a short time.

MODES FOR CARRYING OUT THE INVENTION (First Embodiment)

Embodiments of the present invention will hereinafter be described with reference to the accompanying drawings.

Figure 1:
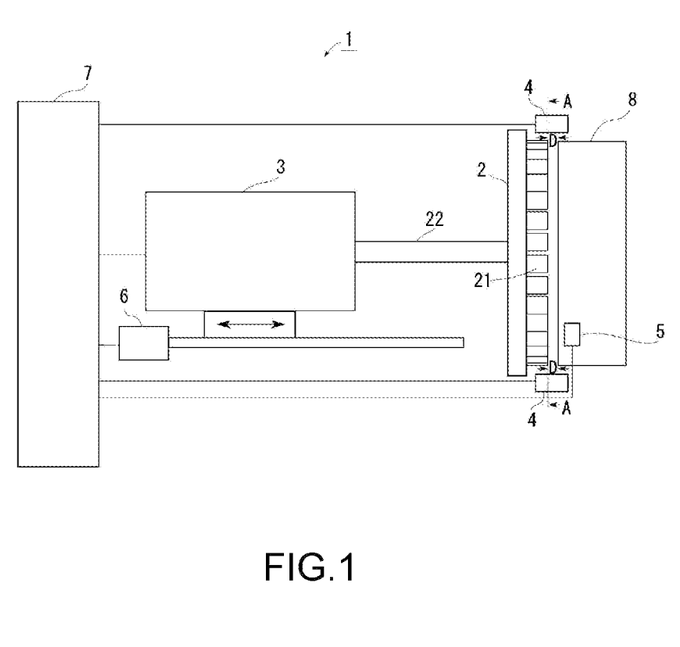
FIG. 1 is a block diagram schematically showing the general configuration of an electromagnetic induction heating apparatus 1 according to a first embodiment.

FIG. 1 is a block diagram schematically showing the general configuration of an electromagnetic induction heating apparatus 1 according to a first embodiment of the present invention. As shown in the figure, the electromagnetic induction heating apparatus 1 of the present embodiment includes a rotating body 2, a rotation driving motor (rotation driving means) 3, a distance measuring means 4, a temperature measuring means 5, a moving motor (moving means) 6, and a control means 7.

Figure 2:
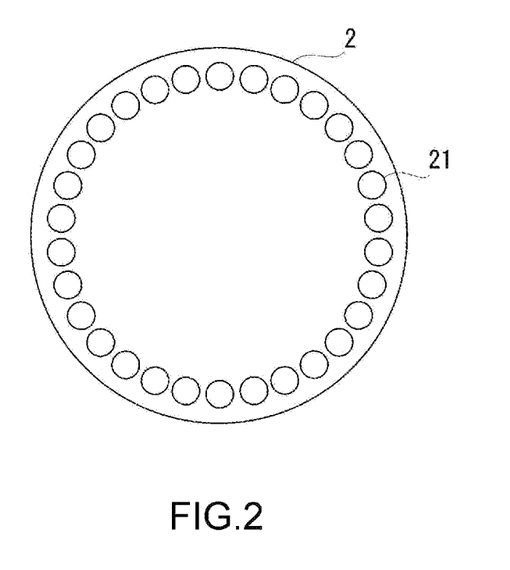
FIG. 2 is a front view in the direction of the arrows AA in FIG. 1 in which a rotating body 2 is viewed from the side of the magnet surface on which magnets 21 are provided.

FIG. 2 is a front view in the direction of the arrows AA in FIG. 1 in which a rotating body 2 is viewed from the side of a surface on which magnets 21 are provided (hereinafter referred to also as "magnet surface"). As shown in FIGS. 1 and 2, the rotating body 2 is arranged such that a plurality of the magnets 21 are arranged concentrically (annularly) on one surface of a disk. The rotating body 2 is connected with the rotation driving motor 3 on the surface opposite to the magnet surface via a rotating shaft 22 at the center of the concentric circle of the magnets 21. The rotation driving motor 3 is arranged to rotate the rotating body 2 to cause an induced current to be generated in an object to be heated 8 and heat the object to be heated 8. Alternative known means other than the rotating shaft 22, such as a chain or a belt, may be used as a means for connecting the rotating body 2 with the rotation driving motor 3.

As the magnets 21, ferrite magnets, samarium-cobalt magnets (Sm—Co-based magnets), rare-earth magnets such as neodymium magnets (Nd—Fe—B-based magnets), alnico magnets (Al—Ni—Co magnets), and the like can be employed. Magnets having high magnetic energy such as rare-earth magnets are preferable in terms of heating the object to be heated 8 efficiently.

Figure 3:
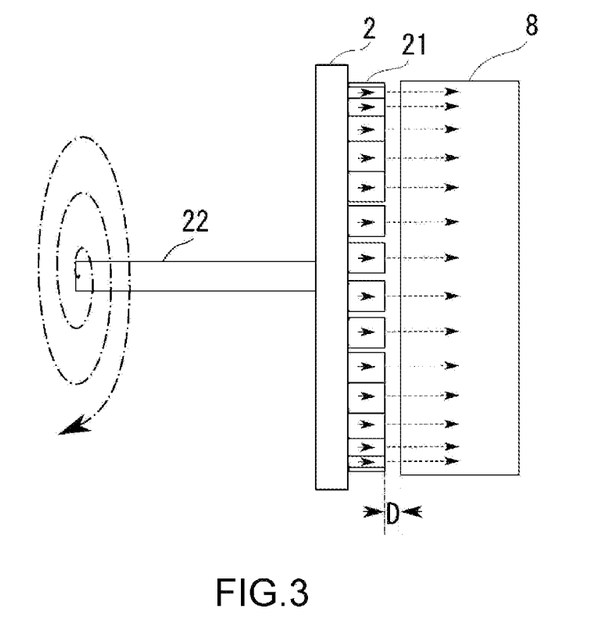
FIG. 3 is a side view showing the rotating body 2 and an object to be heated 8.

FIG. 3 is a side view showing the rotating body 2 and the object to be heated 8. In the figure, the arrows on the magnets 21 indicate that the start point shows the South pole side, while the end point shows the North pole side. While FIG. 3 shows an example in which the North pole of all the magnets 21 is positioned on the side of the object to be heated 8, another arrangement may be employed in which the South pole of all the magnets 21 is positioned on the side of the object to be heated 8. Since the magnets 21 are all arranged such that the same pole is positioned on the side of the object to be heated 8, the magnetic fluxes are in parallel, as indicated by the dotted arrows in FIG. 3, and the magnetic field lines run farther from the rotating body 2. It is therefore possible, upon rotation of the rotating body 2, to generate an induced current of a large eddy-shape (hereinafter referred to also as "eddy current") within a large area of the object to be heated 8 and thereby to heat the object to be heated 8 efficiently.

FIG. 3 shows an arrangement in which the rotating body 2 is rotated to generate an induced current in the object to be heated 8. However, it may be arranged such that the rotating body 2 is fixed, while the object to be heated 8 is rotated to generate an induced current. It is, however, preferable that the rotating body 2 be rotated in a case where rare-earth magnets, which have a relatively low Curie point, are employed as the magnets 21 because rotation of the rotating body 2 provides a cooling effect on the magnets 21. The electromagnetic induction heating apparatus 1 may cool the magnets 21 using a cooling means such as a cooling fan.

The rotation driving motor 3 (see FIG. 1) is for rotationally driving the rotating body 2 via the rotating shaft 22 and also arranged such that the rotation torque, rotation speed, etc., can be changed by the control means 7 to be described hereinafter.

The distance measuring means 4 is for measuring a distance D between the end of each magnet 21 of the rotating body 2 on the side of the object to be heated 8 and the object to be heated 8. The distance measuring means 4 includes, for example, a means for detecting a change in the electrostatic capacity between each magnet 21 of the rotating body 2 and the object to be heated 8 or a change in a laser beam passing through the clearance gap therebetween.

While FIG. 1 shows an example in which two distance measuring means 4 are provided, one or three or more distance measuring means 4 may be provided. In terms of the accuracy of measurement, it is preferable to use a plurality of the distance measuring means 4 to measure the distance D.

The temperature measuring means 5 measures the temperature of the object to be heated 8 and outputs the results to the control means 7. As the temperature measuring means 5, a known temperature sensor such as a thermocouple can be employed. While it may be arranged such that the temperature of the object to be heated 8 is measured at one site as shown in FIG. 1, it is preferable to use a plurality of the temperature measuring means 5 to measure the temperature of the object to be heated 8 in a case where it is necessary to measure the temperature for each part of the object to be heated 8.

The moving motor 6 moves the rotation driving motor 3 in a direction parallel to the rotating shaft 22 to change the distance D between the rotating body 2 and the object to be heated 8. For example, in a case where it is measured by the distance measuring means 4 that the object to be heated 8 is thermally expanded and thereby the distance D is reduced, the rotation driving motor 3 can be moved in a direction away from the object to be heated 8 such that the distance D is kept at a level for good heating efficiency.

While FIG. 1 shows an arrangement in which the moving motor 6 for moving the rotation driving motor 3 is provided to change the position of the rotating body 2, it may be arranged such that the position of the object to be heated 8 is changed or the positions of the rotating body 2 and the object to be heated 8 are respectively changed.

The control means 7 is electrically connected with the above-described rotation driving motor 3, distance measuring means 4, temperature measuring means 5, and the moving motor 6 in a wired or wireless manner to respectively control them and can be configured using, for example, a computer, etc. Control by the control means 7 will hereinafter be described.

The control means 7 controls the rotation driving motor 3 and the moving motor 6 using the distance D measured by the distance measuring means 4. In a case where expansion/deformation of the object to be heated 8 due to heating is detected, the rotation driving motor 3 is stopped and/or the rotating body 2 is moved by the moving motor 6. This can prevent the rotating body 2 and the object to be heated 8 from coming into contact with each other. For example, in a case where the distance D between the rotating body 2 and the object to be heated 8 is reduced to a level of possible risk of contact therebetween, the rotating body 2 is moved in a direction away from the object to be heated 8. At this time, keeping the distance D at a level for good heating efficiency allows for achieving good heating efficiency.

The control means 7 can control the rotation driving motor 3 and the moving motor 6 using the temperature of the object to be heated 8 measured by the temperature measuring means 5. For example, the temperature of the object to be heated 8 can be finely controlled by keeping the distance D and the rotation speed at a level for high heating efficiency until the object to be heated 8 reaches a predetermined temperature, while by changing the distance D and the rotation speed as the targeted temperature gets near. At the time when the object to be heated 8 reaches the predetermined temperature, the rotation driving motor 3 may be stopped and the rotating body 2 may be moved in a direction away from the object to be heated 8.

In a case where the electromagnetic induction heating apparatus 1 includes a plurality of the distance measuring means 4, the control means 7 may control each part using the maximum value or the minimum value of a plurality of distances D detected.

The object to be heated 8 is made of material with which an eddy current is generated by changing a magnetic field. The object to be heated 8 includes, for example, an article made of aluminum alloy containing aluminum, etc., specifically an aluminum sash, an aluminum wheel, etc. Also, an article made of light alloy, which is mainly made of light metal such as aluminum, magnesium, titanium may be heated as the object to be heated 8.

Figure 4:
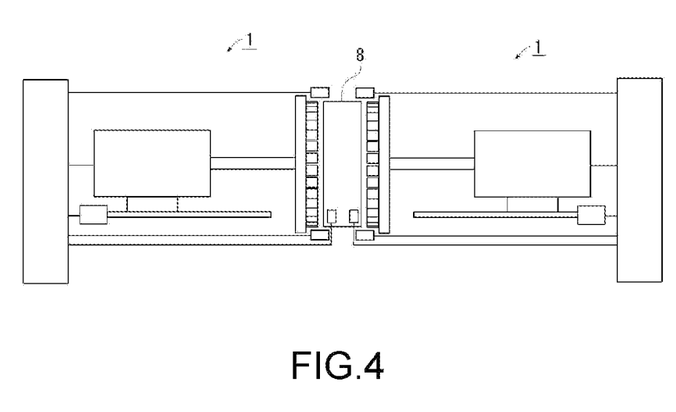
FIG. 4 is a block diagram schematically showing a variation of the electromagnetic induction heating apparatus 1 in FIG. 1.

FIG. 4 is a block diagram schematically showing a variation of the electromagnetic induction heating apparatus 1 of the present embodiment. As shown in the figure, it may be arranged such that the electromagnetic induction heating apparatuses 1 are arranged on either side of the object to be heated 8. By using a plurality of the electromagnetic induction heating apparatuses 1, it is possible to shorten the time until the object to be heated 8 reaches a predetermined temperature and to heat the object to be heated 8 to a higher temperature.

(Second Embodiment)

An aluminum wheel manufacturing method will be described in which the electromagnetic induction heating apparatus 1 described in the first embodiment is used to heat a half-finished aluminum wheel made of aluminum alloy as an example light alloy wheel.

Figure 5:
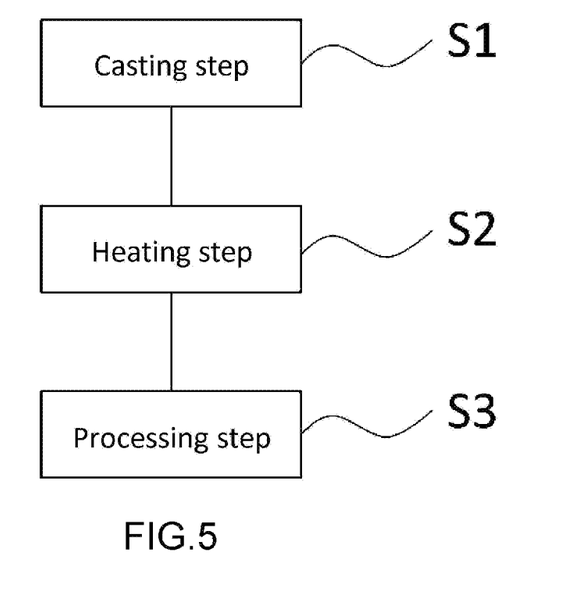
FIG. 5 is a flowchart of an aluminum wheel manufacturing method according to a second embodiment.

FIG. 5 is a flow chart of an aluminum wheel manufacturing method according to a second embodiment of the present invention. As shown in the figure, the aluminum wheel manufacturing method of the present embodiment includes a casting step S1 of casting a predetermined aluminum alloy material to form a half-finished aluminum wheel, a heating step S2 of heating the half-finished aluminum wheel formed in the casting step S1, and a processing step S3 of processing the half-finished aluminum wheel heated in the heating step S2 to form a rim portion of a predetermined form.

(Casting Step S1)

In the casting step S1, molten metal is poured into a cavity formed by a mold, and after cooling, the mold is opened to form a half-finished aluminum wheel as an aluminum alloy cast. In a case of manufacturing an integrated (one-piece type) aluminum wheel, a rim portion and a disk portion are formed integrally. In a case of manufacturing a separated (two-piece type) aluminum wheel, a rim portion and a disk portion are formed separately. In both cases, the rim portion is partially deformed in the following processing step S3 to have a predetermined shape.

In the present invention, the aluminum alloy cast formed in the casting step S1 is called a half-finished aluminum wheel (near net shape).

(Heating Step S2)

In the heating step S2, the half-finished aluminum wheel is preliminarily heated to a temperature suitable for processing in the following processing step S3.

A heating furnace has conventionally been used to heat, before a processing step, a half-finished aluminum wheel to a temperature of, for example, about 150 to 400° C. suitable for processing. However, heating using the heating furnace takes a long time to heat the half-finished aluminum wheel to a predetermined temperature and requires a large installation space, which lowers the economic efficiency of aluminum wheel manufacturing.

Also, in the conventional heating using the heating furnace, the entire half-finished aluminum wheel is heated to a predetermined temperature. However, only the rim portion on one of the side surfaces of the half-finished aluminum wheel is processed in the processing step S3. For example, in a case of processing an integrated aluminum wheel, it is preferable to keep the other side surface at a lower temperature so that the disk portion formed in the casting step S1 is not deformed in the processing step S3. Accordingly, if it is possible to heat one of the side surfaces of the half-finished aluminum wheel to undergo plastic deformation to a temperature higher than that of the other side surface, the efficiency of aluminum wheel manufacturing can be further increased.

Therefore, in the heating step S2 of the aluminum wheel manufacturing method of the present embodiment, the half-finished aluminum wheel is heated through electromagnetic induction using the electromagnetic induction heating apparatus 1. The electromagnetic induction heating apparatus 1 can heat the half-finished aluminum wheel efficiently and can be installed in a narrow space. It is therefore possible to save time, energy, space, etc., required for aluminum wheel manufacturing.

In addition, by using the electromagnetic induction heating apparatus 1, it is possible to heat one of the side surfaces of the half-finished aluminum wheel selectively to a high temperature, that is, it is possible to heat the half-finished aluminum wheel such that a temperature gradient is generated therein. Thus, in the processing step S3, one of the side surfaces can have a temperature suitable for processing, while the other side surface can have a temperature at which no unintended deformation or the like can occur.

According to the heating step S2 using the electromagnetic induction heating apparatus 1, it is possible to heat the half-finished aluminum wheel to, for example, about 150 to 500° C.

(Processing Step S3)

In the processing step S3, the half-finished aluminum wheel formed in the casting step S1 is deformed into a predetermined shape. The processing step S3 includes, for example, a plastic working step and a forging (pressing) step.

In the plastic working step, the half-finished aluminum wheel is placed within and rotated together with a pressure resistant formwork and, at the same time, a roller is pressed against and moved on a portion to be formed into a rim portion at a predetermined pressure to form a predetermined shape. In the plastic working step, processing is performed in which the rim portion is stretched which is formed thicker in the half-finished aluminum wheel than in the finished product.

In the forging step, the half-finished aluminum wheel is placed within a pressure resistant mold and formed by a high-pressure press into an aluminum wheel of a predetermined shape. The forging step is preferably used for manufacturing of aluminum wheels for large-sized vehicles such as buses and trucks.

It is preferable that at the time when the processing step S3 is completed, the entire aluminum wheel has a uniform temperature in terms of preventing deformation of the finished aluminum wheel. In a case of plastic working for a predetermined shape, the rim portion undergoes a larger decrease in the temperature on one side to be stretched in the processing step S3 than on the other side. For this reason, if the rim portion on one side to be processed has a higher temperature at the start of the processing step S3, the aluminum wheel can have a reduced strain. From this point of view, the temperature difference between the rim portion on one side to be stretched and the rim portion on the other side is preferably 100° C. or lower, more preferably 50° C. or lower, and still more preferably 30° C. or lower when the processing step S3 is completed. It is noted that the "temperature difference" here means the average value of the respective temperatures of the rim portions on one side to be stretched and on the other side.

Figure 6:
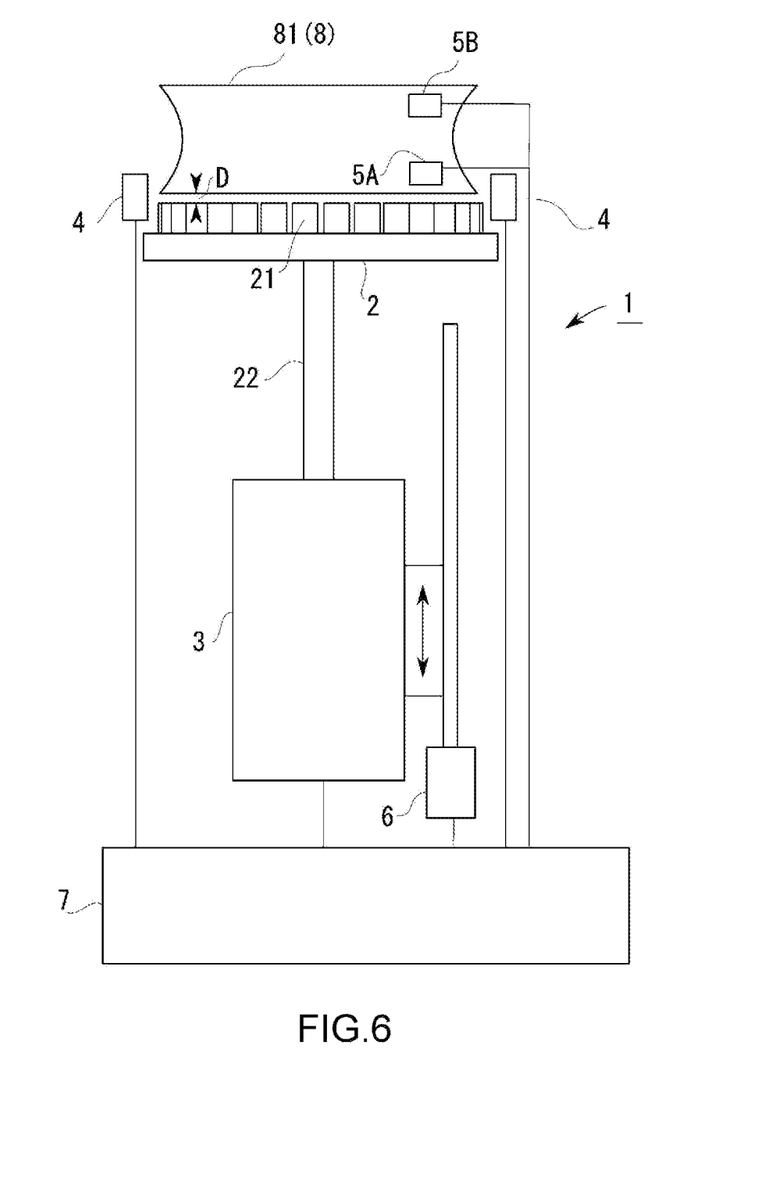
FIG. 6 is a block diagram schematically showing a heating step using the electromagnetic induction heating apparatus 1 in the aluminum wheel manufacturing method according to the second embodiment.

FIG. 6 is a block diagram schematically showing the heating step S2 using the electromagnetic induction heating apparatus 1 of the present embodiment. The electromagnetic induction heating apparatus 1 shown in the figure includes, as the temperature measuring means 5, a temperature measuring means 5A for measuring a first temperature of a half-finished aluminum wheel 81 on the side of the rotating body and a temperature measuring means 5B for measuring a second temperature on the side opposite to the rotating body 2. The "half-finished aluminum wheel 81" will hereinafter be referred to also as "aluminum wheel 81" where appropriate.

As shown in FIG. 6, in the heating step S2, the rotating body 2 is rotated only below the half-finished aluminum wheel 81, that is, the object to be heated 8. Since this allows only one side of the half-finished aluminum wheel 81 to be heated, the side surface to be processed in the processing step can selectively have a higher temperature with a temperature gradient generated in the aluminum wheel 81. In addition, since the rotating body 2 is rotated below the aluminum wheel 81, the heat from the heated aluminum wheel 81 can have a reduced effect on the magnets 21.

In the heating step S2 (see FIG. 5), the control means 7 controls the rotation driving motor 3 and the moving motor 6 based on the first and second temperatures measured by the temperature measuring means 5A and 5B. Thus, one of the side surfaces of the half-finished aluminum wheel 81 on the side of the rotating body 2 can have a predetermined temperature suitable for processing, while the side surface opposite to the rotating body 2 can have a temperature at which no unintended deformation can occur.

In terms of the heating efficiency in the heating step S2 and the side surfaces of the half-finished aluminum wheel 81 having temperatures suitable in the processing step S3, the difference between the first and second temperatures measured by the temperature measuring means 5A and 5B in the heating step S2 is preferably 50 to 150° C., more preferably 70 to 130° C., and still more preferably 80 to 130° C.

It is noted that the second embodiment describes the case of an aluminum wheel manufacturing method in which the electromagnetic induction heating apparatus 1 according to the present invention is used. In a case of manufacturing an aluminum sash, it is necessary to heat a columnar aluminum alloy raw material to a predetermined temperature before passing through a die into a predetermined shape. In this case, using the electromagnetic induction heating apparatus 1 according to the present invention allows the columnar aluminum alloy raw material to be heated such that a temperature gradient is generated therein. If the end of the columnar aluminum alloy raw material to first pass through the die is heated to have a higher temperature than the end to later pass through the die, the aluminum sash can be made with a uniform temperature when the processing step is completed, whereby it is possible to efficiently manufacture aluminum sashes with the strain due to temperature non-uniformity being reduced.

EXAMPLES

The present invention will hereinafter be described more specifically according to examples, however, the present invention is not restricted thereto.

With an electromagnetic induction heating apparatus 1 configured as follows (see FIG. 6), a thermocouple was used as the temperature measuring means 5A for measurement which was embedded 44 mm from a side end face of an object to be heated 8 on the side of a rotating body 2 in a hole opened through the side end face.

Object to be heated
 Material: made of aluminum allow
 Profile: diameter 425 mm×118 mm
 Weight: 11.8 kg
 Specific heat: 900 (J/Kg K) (20° C.)
 Thermal conductivity: 204 (W/m K)

First Example

Figure 7:
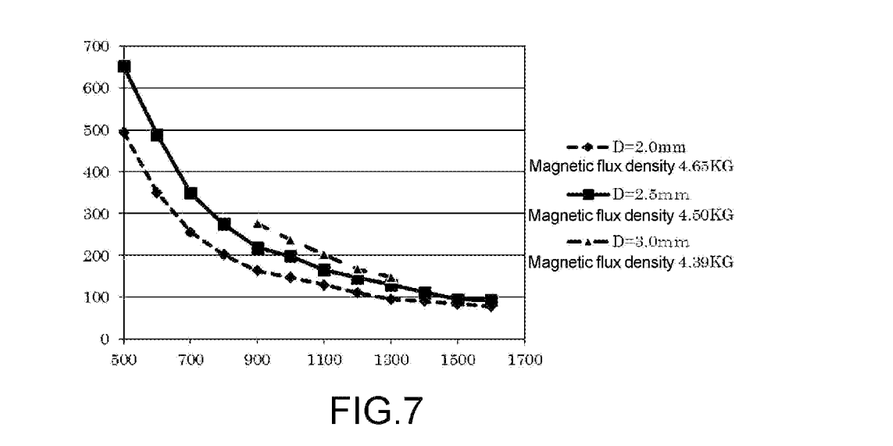
FIG. 7 is a graph showing results of measurements of a first example.

An electromagnetic induction heating apparatus 1 was used including a rotating body 2 with 28 neodymium magnets evenly arranged on a circumference having a diameter of 390 mm and a rotation driving motor 3 having an output of 11 KW. The distance D from the object to be heated 8 to the magnets 21 of the rotating body 2 was set to 2.0 mm, 2.5 mm, and 3.0 mm. For each distance, the rotation speed of the rotating body 2 was changed to measure the time (seconds) required for the difference between the room temperature and the temperature of the object to be heated 8 to reach 100° C., that is, for the temperature of the object to be heated 8 to rise by 100° C. from the room temperature. Table 1 and FIG. 7 show the results.

TABLE 1

Heating time (seconds) required for 100° C. rise from the room temperature

| Rotation speed (rpm) | D = 2.0 mm Magnetic flux density 4.65 KG | D = 2.5 mm Magnetic flux density 4.50 KG | D = 3.0 mm Magnetic flux density 4.39 KG |
|---|---|---|---|
| 500 | 494 | 652 | — |
| 600 | 350 | 489 | — |
| 700 | 255 | 349 | — |
| 800 | 201 | 274 | — |
| 900 | 163 | 219 | 276 |
| 1000 | 147 | 198 | 237 |
| 1100 | 129 | 165 | 201 |
| 1200 | 110 | 146 | 167 |
| 1300 | 95 | 129 | 148 |
| 1400 | 90 | 111 | — |
| 1500 | 84 | 95 | — |
| 1600 | 77 | 93 | — |

Second Example

Figure 8:
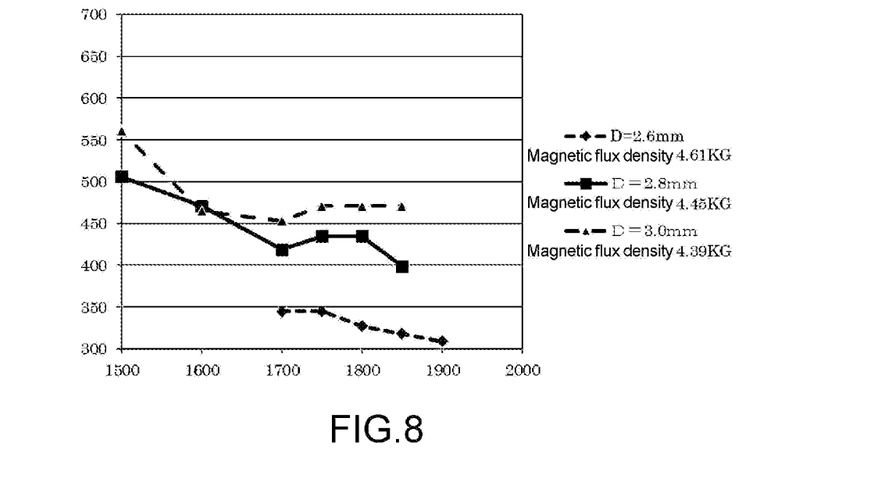
FIG. 8 is a graph showing results of measurements of a second example.

With the same electromagnetic induction heating apparatus 1 as in the first example, the distance D from the end of the object to be heated 8 to the magnets 21 of the rotating body 2 was set to 2.6 mm, 2.8 mm, and 3.0 mm. For each distance, the rotation speed of the rotating body 2 was changed to measure the time (seconds) required for the difference between the room temperature and the temperature of the object to be heated 8 to reach 200° C., that is, for the temperature of the object to be heated 8 to rise by 200° C. from the room temperature. Table 2 and FIG. 8 show the results.

TABLE 2

Heating time (seconds) required for 200° C. rise from the room temperature

| Rotation speed (rpm) | D = 2.6 mm Magnetic flux density 4.61 KG | D = 2.8 mm Magnetic flux density 4.45 KG | D = 3.0 mm Magnetic flux density 4.39 KG |
|---|---|---|---|
| 1400 | — | — | 597 |
| 1500 | — | 506 | 561 |
| 1600 | — | 471 | 465 |
| 1700 | 345 | 419 | 453 |
| 1750 | 345 | 435 | 471 |
| 1800 | 327 | 435 | 471 |
| 1850 | 318 | 399 | 471 |
| 1900 | 309 | — | — |

Third Example

With the same electromagnetic induction heating apparatus 1 as in the first example, the object to be heated of D=2.0 mm, which required the shortest heating time in the first example, was heated at a rotation speed of 1750 rpm for 846 seconds, and a temperature of 350° C. was achieved.

Fourth Example

Figure 9:
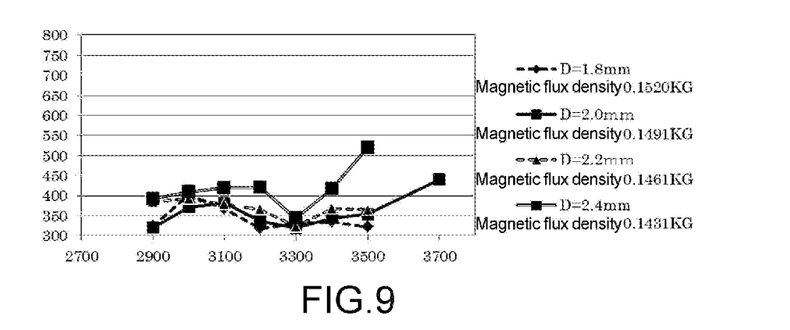
FIG. 9 is a graph showing results of measurements of a fourth example.
Figure 10:
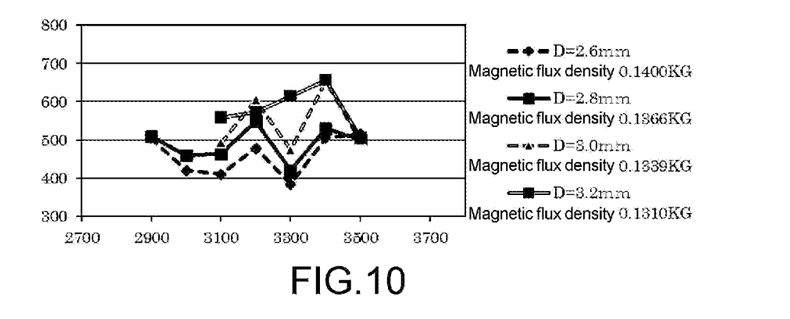
FIG. 10 is a graph showing results of measurements of the fourth example.
Figure 11:
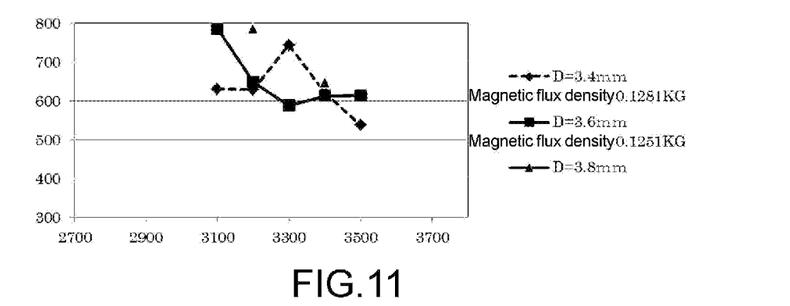
FIG. 11 is a graph showing results of measurements of the fourth example.

The electromagnetic induction heating apparatus 1 used was different from that in the first example in that the rotating body 2 includes ferrite magnets instead of neodymium magnets and that the rotation driving motor 3 has an output of 3.5 KW. The distance D from the end of the object to be heated 8 to the magnets 21 of the rotating body 2 was set to 1.8 mm, 2.0 mm, 2.2 mm, 2.4 mm, 2.6 mm, and 2.8 mm. For each distance, the rotation speed of the rotating body 2 was changed to measure the time (seconds) required for the object to be heated 8 at the room temperature to reach 40° C. Table 3 and FIGS. 9 to 11 show the results.

TABLE 3

Heating time (seconds) required for 40° C. rise from the room temperature

| Rotation speed (rpm) | D = 1.8 mm Magnetic flux density 0.1520 KG | D = 2.0 mm Magnetic flux density 0.1491 KG | D = 2.2 mm Magnetic flux density 0.1461 KG | D = 2.4 mm Magnetic flux density 0.1431 KG |
|---|---|---|---|---|
| 2900 | 324 | 320 | 385 | 392 |
| 3000 | 402 | 371 | 392 | 410 |
| 3100 | 368 | 381 | 379 | 420 |
| 3200 | 318 | 337 | 366 | 421 |
| 3300 | 331 | 319 | 323 | 344 |
| 3400 | 335 | 344 | 368 | 417 |
| 3500 | 322 | 354 | 365 | 520 |
| 3700 | — | 441 | — | — |

| Rotation speed (rpm) | D = 2.6 mm Magnetic flux density 0.1400 KG | D = 2.8 mm Magnetic flux density 0.1366 KG | D = 3.0 mm Magnetic flux density 0.1339 KG | D = 3.2 mm Magnetic flux density 0.1310 KG |
|---|---|---|---|---|
| 2900 | 505 | 510 | — | — |
| 3000 | 420 | 459 | — | — |
| 3100 | 410 | 464 | 493 | 558 |
| 3200 | 478 | 548 | 604 | 572 |
| 3300 | 384 | 420 | 474 | 614 |
| 3400 | 505 | 529 | 653 | 656 |
| 3500 | 516 | 501 | 499 | 506 |

TABLE 3-continued

Heating time (seconds) required for 40° C. rise from the room temperature

| Rotation speed (rpm) | D = 3.4 mm Magnetic flux density 0.1281 KG | D = 3.6 mm Magnetic flux density 0.1251 KG | D = 3.8 mm |
|---|---|---|---|
| 3100 | 631 | 786 | — |
| 3200 | 629 | 649 | 786 |
| 3300 | 745 | 589 | — |
| 3400 | 623 | 613 | 647 |
| 3500 | 538 | 614 | — |

The following are found from the results of the first to fourth examples:
(1) In both the first to third examples in which neodymium magnets were used and the fourth example in which anisotropic ferrite magnets were used, it was possible to heat the aluminum alloy objects to be heated through magnetic induction.
(2) It was possible to heat the aluminum alloy objects to be heated to 350° C., which was sufficient for processing, by using neodymium magnets.
(3) Neodymium magnets and anisotropic ferrite magnets have their respective different rotation speeds at which a good heating efficiency can be achieved. In these examples, about 1750 (rpm) was best for neodymium magnets, while about 3100 (rpm) was best for anisotropic ferrite magnets, respectively.
(4) Reducing the distance D between the object to be heated and the magnets had a beneficial effect on increasing the heating efficiency.
(5) When heated under the condition that the difference between the first temperature of the object to be heated on the side of the rotating body and the second temperature on the opposite side was about 100° C., the heating efficiency was better than when heated under the condition of about 200° C.

INDUSTRIAL APPLICABILITY

The electromagnetic induction heating apparatus according to the present invention is useful as, for example, an apparatus for efficiently heating a half-finished light alloy wheel or the like to a predetermined temperature suitable for a processing step in a short time.

What is claimed is:
1. An electromagnetic induction heating apparatus comprising:
a rotating body with a plurality of magnets arranged such that the same pole is positioned on a side of an object to be heated;
a rotation driving means for rotating the rotating body;
a temperature sensor for measuring a temperature of the object to be heated; and
a moving means for moving at least one of the rotating body and the object to be heated to change a distance between the rotating body and the object to be heated, wherein
the rotating body is arranged with the plurality of magnets, wherein
the object to be heated is a half-finished light alloy wheel, wherein
the temperature sensor measures first temperature of the half-finished light alloy wheel on a side of the rotating body and second temperature of the half-finished light alloy on an opposite side of the rotating body, wherein
the moving means changes the distance based on the first temperature and the second temperature, wherein
the rotation driving means changes a rotation speed of the rotating body based on the first temperature and the second temperature, and wherein
the object to be heated is heated by an induced current generated when the rotating body is rotated.
2. The electromagnetic induction heating apparatus according to claim 1, wherein
at least one of the rotation speed of the rotating body and the distance between the magnets and the object to be heated is changed such that the difference between the first temperature and the second temperature becomes 50 to 150° C.
3. A light alloy wheel manufacturing method comprising a heating step of heating a half-finished light alloy wheel through electromagnetic induction, wherein in the heating step, the half-finished light alloy wheel is heated by an induced current generated when the rotating body of the electromagnetic induction heating apparatus, the electromagnetic induction heating apparatus comprising:
a rotating body with a plurality of magnets arranged such that the same pole is positioned on a side of the half-finished light alloy wheel to be heated;
a rotation driving means for rotating the rotating body;
a temperature sensor for measuring a temperature of the half-finished light alloy wheel to be heated; and
a moving means for moving at least one of the rotating body and the half-finished light alloy wheel to be heated to change a distance between the rotating body and the half-finished light alloy wheel to be heated, wherein
the rotating body is arranged with the plurality of magnets, wherein
the temperature sensor measures first temperature of the half-finished light alloy wheel on a side of the rotating body and second temperature of the half-finished light alloy on an opposite side of the rotating body, wherein the moving means changes the distance based on the first temperature and the second temperature, wherein the rotation driving means changes a rotation speed of the rotating body based on the first temperature and the second temperature, and wherein the electromagnetic induction hearting apparatus is rotated below the half-finished light alloy wheel.
4. The light alloy wheel manufacturing method according to claim 3, further comprising:
a casting step of forming the half-finished light alloy wheel; and
a processing step of processing the light alloy wheel heated in the heating step.

* * * * *